(12) United States Patent
Ryan (10) Patent No.: US 10,484,599 B2
(45) Date of Patent: Nov. 19, 2019

(54) SIMULATING DEPTH OF FIELD

(71) Applicant: MICROSOFT TECHNOLOGY LICENSING, LLC, Redmond, WA (US)

(72) Inventor: Patrick Ryan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 15/448,425

(22) Filed: Mar. 2, 2017

(65) Prior Publication Data

US 2018/0115700 A1 Apr. 26, 2018

Related U.S. Application Data

(60) Provisional application No. 62/412,766, filed on Oct. 25, 2016.

(51) Int. Cl.
*H04N 5/232* (2006.01)
*H04N 13/204* (2018.01)
(Continued)

(52) U.S. Cl.
CPC ......... *H04N 5/23222* (2013.01); *G01B 11/24* (2013.01); *G06T 3/0093* (2013.01); *G06T 5/003* (2013.01); *G06T 7/40* (2013.01); *G06T 15/04* (2013.01); *G06T 17/00* (2013.01); *H04N 5/23212* (2013.01); *H04N 5/23293* (2013.01); *H04N 13/122* (2018.05); *H04N 13/204* (2018.05); *G06T 2200/21* (2013.01); *G06T 2207/10028* (2013.01); *H04N 13/128* (2018.05);
(Continued)

(58) Field of Classification Search
None
See application file for complete search history.

(56) References Cited

U.S. PATENT DOCUMENTS 7,453,459 B2 11/2008 Shekter
7,813,591 B2 10/2010 Paley et al.
(Continued)

FOREIGN PATENT DOCUMENTS

WO 2016018422 A1 2/2016

OTHER PUBLICATIONS

"International Search Report and Written Opinion Issued in PCT Application No. PCT/US2017/057066", dated Jan. 24, 2018, 12 Pages.
(Continued)

*Primary Examiner* — Hunter B Lonsberry
*Assistant Examiner* — Charles N Hicks
(74) *Attorney, Agent, or Firm* — Shook, Hardy and Bacon, L.L.P.

(57) ABSTRACT

The present disclosure provides approaches to simulating depth of field. In some implementations, an optimal scan distance of a camera from a subject in a physical environment is determined for a scan of the subject by the camera. A blur level is iteratively updated to correspond to a proximity of the camera to the determined optimal scan distance as the proximity changes during the scan. For each update to the blur level from the iteratively updating, an image comprising a three-dimensional (3D) model of the physical environment depicted at the updated blur level is generated on a user device associated with the scan.

20 Claims, 9 Drawing Sheets

(51) Int. Cl.
*G06T 3/00* (2006.01)
*G06T 7/40* (2017.01)
*G06T 17/00* (2006.01)
*G06T 15/04* (2011.01)
*G06T 5/00* (2006.01)
*H04N 13/122* (2018.01)
*G01B 11/24* (2006.01)
*H04N 13/128* (2018.01)
*H04N 13/271* (2018.01)
*H04N 13/00* (2018.01)

(52) U.S. Cl.
CPC ... *H04N 13/271* (2018.05); *H04N 2013/0081* (2013.01)

(56) References Cited

U.S. PATENT DOCUMENTS

| | | | |
|---|---|---|---|
| 8,335,390 B2 | 12/2012 | Li et al. | |
| 8,363,085 B2 | 1/2013 | Michrowski et al. | |
| 9,230,306 B2 | 1/2016 | Sun et al. | |
| 9,307,222 B1* | 4/2016 | Tang | H04N 5/23222 |
| 2010/0253831 A1* | 10/2010 | Kikuchi | H04N 5/23212 |
| | | | 348/345 |
| 2013/0335404 A1 | 12/2013 | Westerinen et al. | |
| 2014/0285677 A1* | 9/2014 | Fujita | H04N 5/23258 |
| | | | 348/208.6 |
| 2015/0054946 A1 | 2/2015 | Zhang | |
| 2015/0123966 A1* | 5/2015 | Newman | G06T 19/006 |
| | | | 345/419 |
| 2016/0093032 A1 | 3/2016 | Lei et al. | |
| 2016/0360081 A1* | 12/2016 | Tsubaki | H04N 5/23264 |
| 2018/0063509 A1* | 3/2018 | Koppal | H04N 5/2254 |

OTHER PUBLICATIONS

Riguer, et al., "Real-Time Depth of Field Simulation", In Book of ShaderX2: Shader Programming Tips and Tricks with DirectX 9, Jan. 1, 2003, 30 Pages.

Held, et al., "Using Blur to Affect Perceived Distance and Size", In Journal of ACM transactions on graphics, vol. 29, Issue 2, Mar. 1, 2010, 33 pages.

Yao, et al., "FocalSpace: Multimodal Activity Tracking, Synthetic Blur and Adaptive Presentation for Video Conferencing", In Proceedings of the 1st symposium on Spatial user interaction, Jul. 20, 2013, 4 pages.

Kosloff, et al., "An Algorithm for Rendering Generalized Depth of Field Effects Based on Simulated Heat Diffusion", In International Conference on Computational Science and Its Applications, Aug. 26, 2007, pp. 1124-1140.

Weyrich, et al., "Post-processing of Scanned 3D Surface Data", In Proceedings of Eurographics symposium on point-based graphics, vol. 4, Jun. 2, 2004, 10 pages.

Izadi, et al., "KinectFusion: Real-time 3D Reconstruction and Interaction Using a Moving Depth Camera", In Proceedings of the 24th annual ACM symposium on User interface software and technology, Oct. 16, 2011, 10 pages.

"An Introduction to 3d Scanning", http://www.creaform3d.com/sites/default/files/assets/technological-fundamentals/ebook1_an_introduction_to_3d_scanning_en_26082014.pdf, Retrieved on: Nov. 8, 2016, 29 pages.

Svay, Maurice, "Add another layer of realism with Depth of Field", https://blog.sketchfab.com/add-another-layer-realism-depth-field/, Retrieved on: Nov. 8, 2016, 33 pages.

Kass, et al., "Interactive Depth of Field Using Simulated Diffusion on a GPU", In Technical report of Pixar Animation Studios, Jan. 2006., 8 pages.

* cited by examiner

SIMULATING DEPTH OF FIELD

CROSS-REFERENCE TO RELATED APPLICATIONS

This application claims the benefit of U.S. Provisional Application No. 62/412,766, titled "Simulating Depth of Field," filed Oct. 25, 2016, which is hereby expressly incorporated by reference in its entirety.

BACKGROUND

Three-Dimensional (3D) scanning technologies allow real-world objects and environments to be converted into corresponding 3D virtual objects. The 3D virtual objects have many possible uses such as for 3D printing, augmented reality (AR) and virtual reality (VR) experiences, rapid prototyping, and more. Typically, a 3D virtual object may be generated by scanning the environment with one or more scanning devices, which include any number of environmental sensors capable of detecting physical features of the real-world. These physical features are translated into corresponding features of the 3D virtual object.

In some approaches to 3D scanning, a user is able to physically manipulate a scanning device, such as a mobile phone, in order to control the device pose, as well as the distance of the device from one or more real world objects and/or spaces that are the subject of a scan. The scanning device can include a camera to collect scan data including distance information about surfaces within its field as well as surface texture and color info nation. In order to receive high quality scan data, the camera should be positioned an optimal distance from the subject of a scan, which may change as different regions are being scanned. This distance may be based on the focal length of the camera. Some cameras have an adjustable focal length, such those with a zoom lens. However, it may not always be feasible to adjust focal length, such as where the camera has a fixed focal length. In these cases, the user may not be able to judge the optimal distance for scanning, which can reduce the quality of the scan.

SUMMARY

In some respects, the present disclosure provides systems and methods of visualization and generation of 3D scanned objects using 3D captured data from a real world object or space. To help users maintain optimal distance to a subject being scanned, aspects of the present disclosure build on learned behavior of the users from photographic standards of focus. In particular, during 3D scanning, an optimal scan distance for a camera and/or scanning device is determined. In various implementations, blur is used to visually indicate to the user proximity of the camera to the scan distance. As the camera moves away from the scan distance, blur is increased. Further, as the camera moves towards the scan distance, blur is decreased. At or near the scan distance, no blur may be presented to the user.

In some implementations, the blur is applied to a 3D representation of the object being scanned. For example, the blur may be applied using texture, which is UV mapped to the 3D representation. This 3D representation can correspond to, for example, a mesh or a point cloud. In some cases, the texture is applied to particles corresponding to the point cloud, such that a blur level of the particles changes to indicate proximity to the scan distance. In some implementations, the blur may be applied using post processing over the entire display comprising the 3D representation. However, applying the blur using texture applied to the 3D representation may be less power and computing intensive, which is especially suitable for battery operated scanning devices.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this disclosure. Rather, the inventors have contemplated that the subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

To help users maintain optimal distance to an object of subject while scanning, aspects of the present disclosure build on learned behavior of the users from photographic standards of focus. In various implementations, a depth of field effect is rendered to encourage the user to move forward or backward to keep their object in focus. This also helps the user stay at a consistent distance from their object, which helps with tracking and pose generation, resulting in a better reconstruction.

During 3D scanning, an optimal scan distance for a camera and/or scanning device is determined. In various implementations, blur is used to visually indicate to the user proximity of the camera to the scan distance. As the camera moves away from the scan distance, blur is increased. Further, as the camera moves towards the scan distance, blur is decreased. At or near the scan distance, no blur may be presented to the user.

In some implementations, the blur is applied to a 3D representation of the object being scanned. For example, the blur may be applied using a texture, which is UV mapped to the 3D representation. This 3D representation can correspond to, for example, a mesh or a point cloud. In some cases, the texture is applied to particles corresponding to the point cloud, such that a blur level of the particles change to indicate proximity to the scan distance.

In some implementations, the blur may be applied as post-effect to the display. This could include rendering the scene fully multiple times to blend together passes that are in focus and passes that are out of focus. However, applying the blur to a texture applied to the 3D representation may be less power and computing intensive, which is especially suitable for battery operated scanning devices. For example, the scanning device may be performing scene tracking, generating depth maps, and rendering the 3D representation of the object on the display, which causes significant heat gain, and consumes power and computing resources. Additionally rendering a depth of field effect therefore introduces a risk to exceeding a performance envelope, such as on mobile devices where the performance envelope may be limiting.

As indicated above, in various implementations, the 3D representation may comprise particles which are rendered to their position on a depth map. The rendered particles may be updated as the pose of the camera changes with respect to the environment. The rendered particles may correspond, for example, to a point cloud or mesh produced using any suitable 3D scanning approach.

In various implementations, the depth of field effect is simulated using texture for each of the particles. The depth of field effect may be applied such that no additional rendering of the scene is required, beyond transparency, which may already be utilized absent the depth of field effect, such that the device performance impact of the effect is minimal.

In some implementations, multiple textures are provided where different ones of the textures represent different levels of blur, or focus for the subject of the 3D scan. At least one of the textures may correspond to a maximum focus for the object, which may not cause any blur to be applied to the 3D representation of the object. The multiple textures may be, for example, provided on a common texture sheet, such as a texture sprite sheet with each texture corresponding to a respective sprite.

For each particle (which may be used interchangeably throughout this description with the broader term visual element or area) of the 3D representation, the system may calculate a distance from the particle in the depth map to a focal distance (also referred to as scan distance above). This focal distance can represent an optimal scan distance for the particle. The calculated difference between the focal distance and a corresponding particle can correspond to the blur or focus level for that particle.

In some implementations, the system selects at least one texture, from the textures representing different levels of blur or focus, based on the determined blur level for a particle (e.g., the texture corresponding to that blur level). This texture can be applied to the particle such that the particle is rendered to indicate the blur level. For example, the system may assign a value to particle shader, which determines which sprite or blend of sprites is rendered. Each particle may be linearly interpolated with its neighbors based on the particles distance from complete focus.

Thus, each particle may be rendered to visually indicate its corresponding blur level, resulting in an illusion of depth of field. The system may from time to time (e.g., periodically at regular intervals and/or intermittently) re-evaluate the aforementioned blur level for each particle, such as based on detecting the camera changing distance from the object. Further, the displayed particles may be updated to result any updated blur levels. Thus, as the user manipulates the camera in space, the depth of field effect may be updated to reflect changes to the positioning of the camera with respect to the object (e.g., in real-time).

In some cases, the focal distance for each particle corresponds a focal plane defined by the object being scanned. Any particle that is coplanar with the focal plane may be considered in complete focus with respect to the object. Further, the focal distance for each particle may correspond to the focal plane and the same focal distance could be used for each particle.

Figure 1:
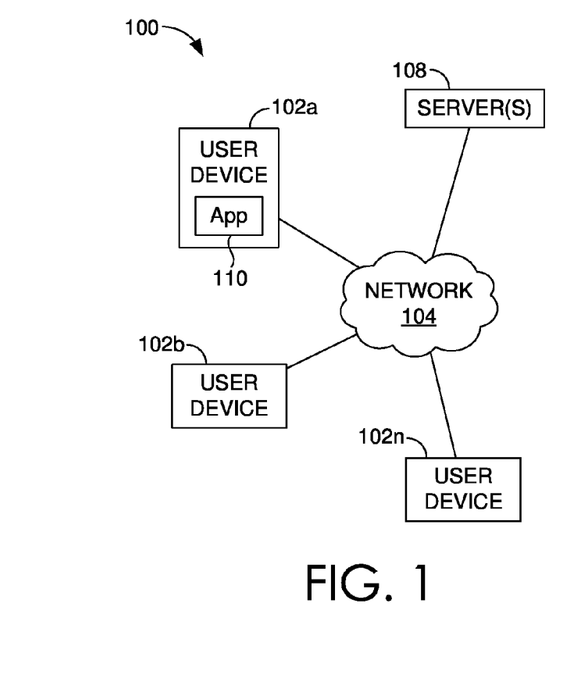
FIG. 1 is a block diagram showing an example of an operating environment, in accordance with embodiments of the present disclosure.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102*a* and 102*b* through 102*n*, network 104, and server(s) 108.

It should be understood that operating environment 100 shown in FIG. 1 is an example of one suitable operating environment. Each of the components shown in FIG. 1 may be implemented via any type of computing device, such as one or more of computing device 1200 described in connection to FIG. 12, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102a through 102n comprise any type of computing device capable of being operated by a user. For example, in some implementations, user devices 102a through 102n are the type of computing device described in relation to FIG. 12 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, a 3D scanning device, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out 3D scanning. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as one or more services). It is therefore contemplated herein that "application" be interpreted broadly.

Server(s) 108 also includes one or more processors, and one or more computer-readable media. The computer-readable media includes computer-readable instructions executable by the one or more processors.

Any combination of the instructions of server (108) and/or user devices 102a through 102n may be utilized to implement one or more components of system 206 of FIG. 2, which is described in additional detail below.

Figure 2:
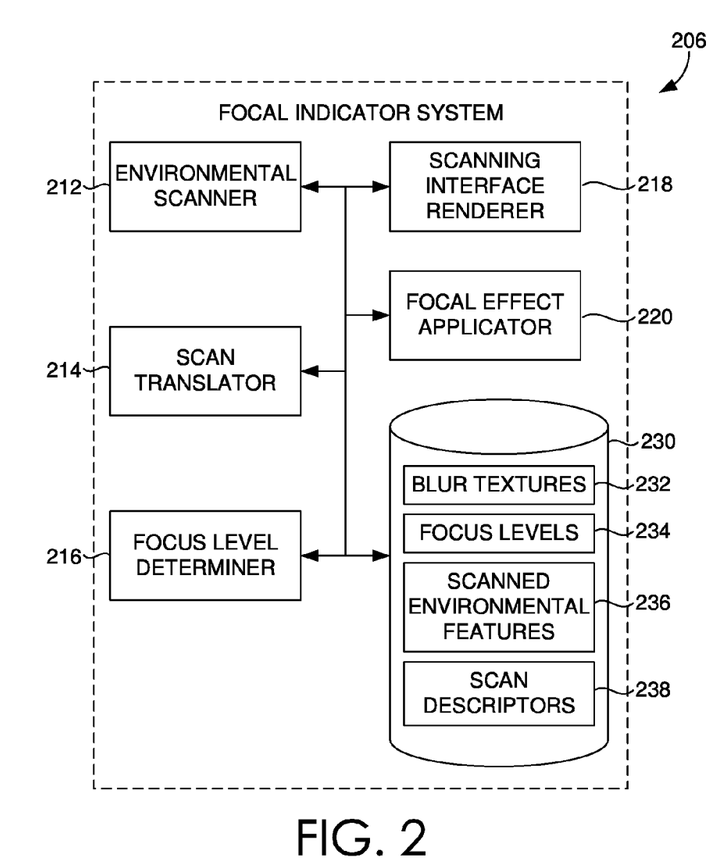
FIG. 2 shows a block diagram of a focal indicator system, in accordance with embodiments of the present disclosure.
Figure 3A:
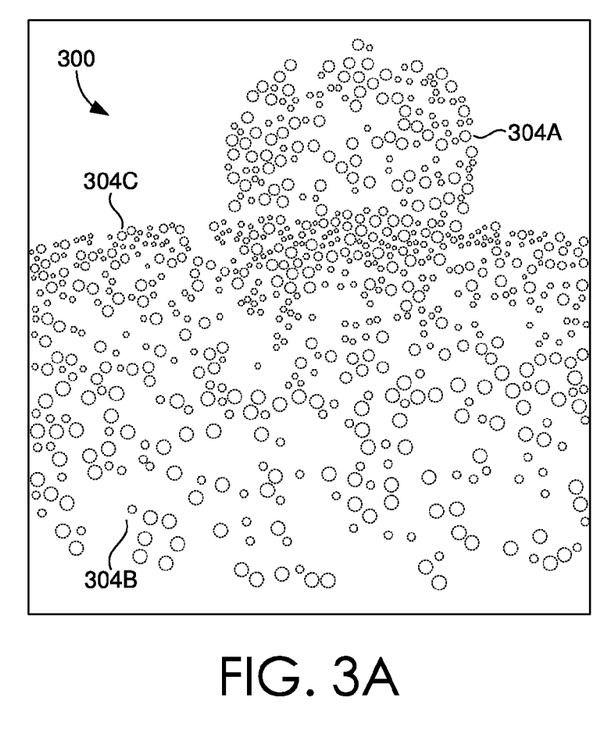
FIGS. 3A, 3B, 3C, 3D, and 3E illustrates a 3D representation as a user moves towards a focal plane, in accordance with embodiments of the present disclosure.
Figure 3B:
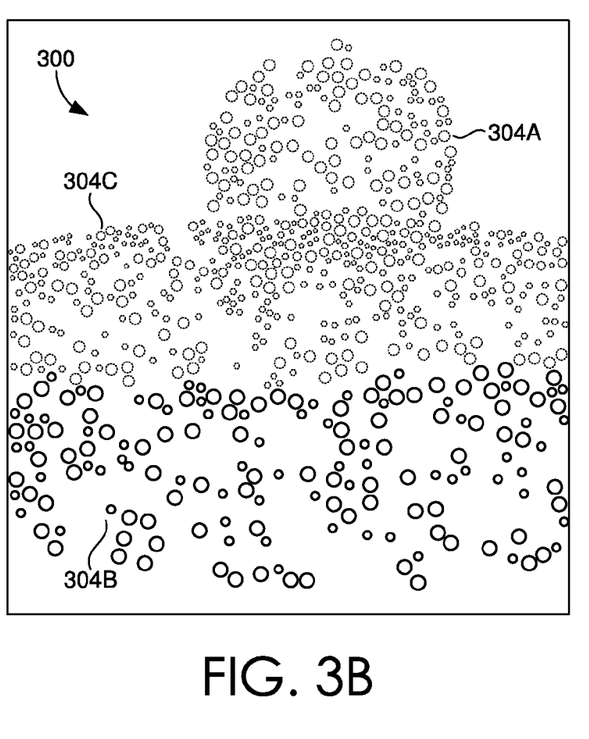
Figure 3C:
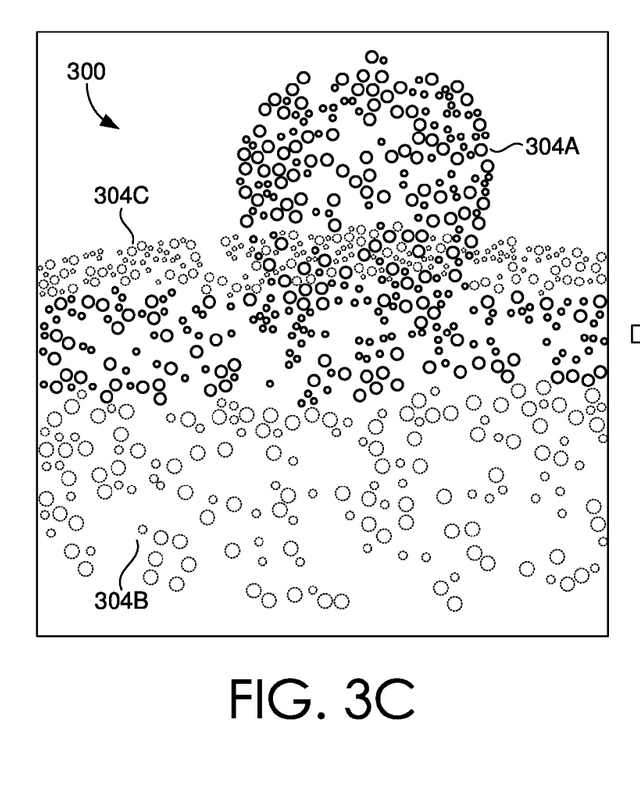
Figure 3D:
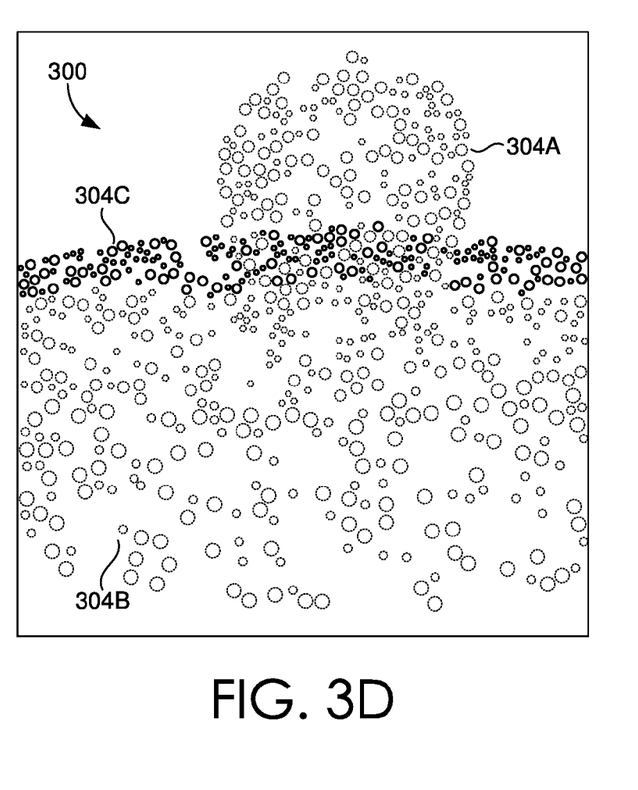
Figure 3E:
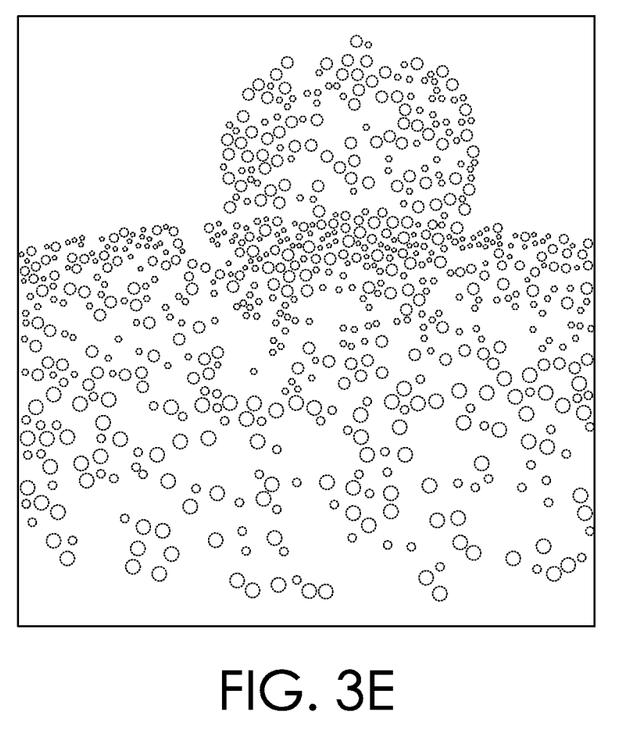

Referring to FIG. 2, a block diagram of a focal indicator system is shown, in accordance with embodiments of the present disclosure. Focal indicator system 206, also referred to as system 200 for brevity, includes environmental scanner 212, scan translator 214, focus level determiner 216, scanning interface renderer 218, focal effect applicator 220, and storage 230. As indicated above, the foregoing components of system 206 can be implemented, for example, in operating environment 100 of FIG. 1. In particular, those components may be integrated into any suitable combination of user devices 102a and 102b through 102n, and server(s) 108. For cloud-based implementations, the instructions on server 108 may implement one or more components or portions thereof of system 206, and application 110 may be utilized by a user to interface with the functionality implemented on server(s) 108. In some cases, server 108 may not be required. For example, the components of system 206 may be implemented completely on a user device, such as user device 102a. In these cases, system 206 may be embodied at least partially by the instructions corresponding to application 110.

Thus, it should be appreciated that system 206 may be provided via multiple devices arranged in a distributed environment that collectively provide the functionality described herein. Additionally, other components not shown may be included within the distributed environment. In addition, or instead, system 206 can be integrated, at least partially, into a user device, such as user device 102a. Furthermore, system 206 may at least partially be embodied as a cloud computing service.

Storage 230 can comprise computer-readable media and is configured to store computer instructions (e.g., software program instructions, routines, or services), data, and/or models used in embodiments described herein. In some implementations, storage 230 stores information or data received via the various components of system 206 and provides the various components with access to that information or data, as needed. In implementations, storage 230 comprises a data store (or computer data memory). Although depicted as a single component, storage 230 may be embodied as one or more data stores and may be at least partially in the cloud. Further, the information in storage 230 may be distributed in any suitable manner across one or more data stores for storage (which may be hosted externally).

In the implementation shown, storage 230 includes at least blur textures 232, focus levels 234, and scanned environmental features 236, which are described in further detail below.

As an overview, scanning interface 218 provides a user interface to environmental scanner 212, which is operable to collect sensor data from one or more sensors (e.g., at least one RGB depth camera) via one or more devices, such as one or more of user devices 102a through 102n in FIG. 1. Scan translator 214 analyzes the sensor data and translates the sensor data into scanned environmental features 236. Scanned environmental features 236 includes at least scanned geometry features and optionally scanned attribute features (e.g., textures, colors, sounds, movements, animations, and the like) for 3D objects. The scanned geometry features can correspond to a 3D representation of an object with the 3D representation comprising visual elements, such as particles. Focus level determiner 216 determines focus levels 234 for the visual elements, such as based on determining a difference between a focal distance and a visual element. Focal effect applicator 220 is configured to render a focal effect based on the determined focus levels 234, such as by applying the focal effect to the 3D representation of the object.

As mentioned above, scanning interface 218 provides a user interface to environmental scanner 212. Scanning interface 218 can, for example, correspond to application 110 of FIG. 1 and include a graphical user interface (GUI) or other suitable interface to assist the user in capturing physical environmental features via environmental scanner 212. Scanning interface 218 can, for example, allow the user to selectively activate or deactivate environmental scanning by environmental scanner 212.

In some cases, the GUI of scanning interface 218 displays the physical environment, such as via a live feed or real-time feed from one or more cameras. In addition or instead, scan data generated by environmental scanner 212 and translated into scanned environmental features 236 by scan translator 214 may be displayed in the GUI. This can include display of 3D geometry for one or more virtual objects, which may be depicted in the GUI using wireframes, meshes, polygons, voxels, particles, and/or other visual representations of the scanned geometry data. This can also optionally include display or presentation of scanned environmental attributes for the one or more virtual objects, such as textures, colors, sounds, animations, movements, and the like. In some cases, scanning interface 218 overlays or renders one or more of these scanned environmental features over the display of the physical environment, such as a live feed of the physical environment from a camera. In others, the physical environment may not necessarily be displayed in the GUI or displayed concurrently with these features.

FIGS. 3A, 3B, 3C, 3D, and 3E show example displays of scanned environmental features in a scanning interface. In particular these figures each depict 3D representation 300 corresponding to one or more real world objects (e.g., including an apple in the present example) at different points in time. The figures are listed in chronological order, and can represent snapshots of what may be displayed by scanning interface 218 during 3D scanning, where 3D representation 300 is included in scanned environmental features 236. As shown in each figure, 3D representation 300 includes many particles, of which particles 304a, 304b, and 304c are specially labeled. Other particles of 3D representation 300 are depicted similar to particles 304a, 304b, and 304c in the figures.

As mentioned previously, as opposed to particles, other visual elements could be employed, although particles are a light weight representation, which may be especially suitable in cases where computing resources are a concern. The particles may, for example, correspond to a point cloud and depth map generated by scan translator 214 from scan data from environmental scanner 212. In some implementations, the point cloud is employed on user device 102a, and at least some of the scan data is streamed to server 108, which generates a mesh from the scan data. Further, server 108 may provide the mesh to user device 102a, such as for display by scanning interface rendered 218. It will be appreciated that many other variations are possible.

Any suitable approach can be used for scanning the physical environmental in order to generate scanned environmental features for the 3D representation. In some approaches, the user manipulates or physically positions one or more user devices, such as user device 102a, in order to allow environmental scanner 212 to capture different perspectives of the environment. For example, the user may adjust the distance angle, rotation, or orientation of a user device (and/or a camera sensor) with respect to the environment as a whole and/or with respect to a region or corresponding real world object or subject the user wishes to scan. In some cases, one or more environmental snapshots are taken at these various device positions. For example, the user may selectively capture each environmental snapshot via scanning interface 218. As another example, a stream of environmental data could be captured via environmental scanner 212.

This environmental data is provided by one or more sensors integrated into or external to one or more user devices, which can include a camera. Examples of suitable sensors to capture environmental data include any combination of a depth sensor, a camera, a pressure sensor, an RGB camera, a depth-sensing camera, a pressure sensor, an IR sensor, and the like. As indicated above, environmental scanner 212 manages these sensors to facilitate the capture of the environmental data.

Scan translator 214 is configured to convert the environmental data into scanned environmental features, such as scanned environmental features 236. A scanned environmental feature refers to a digital representation of a real environmental feature. This can include geometry features which correspond to real world geometry, and attribute features which correspond to real attributes of the environmental. Scan translator can analyze the environmental data and determine geometry features, or geometry, from sensor data which captures the physical geometry of the environment. Scan translator 214 can also determine attribute features, each of which it may associate with one or more of the geometry features (e.g., texture may be mapped to geometry). In some cases, scan translator 214 updates one or more scanned environmental features 236 as more environmental data is received during or after a scan. This may include an update to the 3D representation of the environment.

Many suitable approaches are known for capturing and digitally representing physical environmental features, any of which may be suitable for use in implementations of the present disclosure. Optionally, scan translator 214 may create associations between 3D virtual objects and the scanned environmental features. For example, different subsets of scanned environmental features may be associated with different virtual objects. However, scan translator 214 need not specifically identify and designate virtual objects.

In some implementations, scan translator 214 further converts the environmental data into one or more scan descriptors, such as scan descriptors 238. Scan descriptors 238 correspond to scanned environmental features 236, and generally describe the conditions under which the environmental data corresponding to scanned environmental features 236 were captured. Scan descriptors can, for example, be determined from sensor data to represent one or more distances, angles, rotations, or orientations of the user device(s), or sensors, used to capture the environmental data, with respect to the environment as a whole and/or with respect to a region or corresponding real world object. As examples, a set of one or more scan descriptors may correspond to a particular snapshot of environmental data, and/or a portion of a stream of environmental data.

Using the scan descriptors, scan translator 214 may track a camera and/or user device used to capture the environmental data for a scan with respect to the environment. This could include using scan descriptors 238 to determine which areas of the physical environment are captured in scanned environmental features 236, and which areas of the physical environment have not been captured in scanned environmental features 236, or otherwise corresponding to insufficient data, even where some data is present (e.g., areas with insufficient depth information). One suitable approach scan translator 214 may employ is real-time tracking. Optical based tracking and/or inertial measurement unit (IMU) based device tracking may be employed along with image processing to track the position of the scanning device and/or camera.

In some implementations, the tracking can comprise, for example, six degrees of freedom (6DoF) device tracking. This can be implemented, for example, using simultaneous Localization and Mapping (SLAM). SLAM generally includes constructing and/or updating a map of an unknown environment while simultaneously keeping track of an agent's (e.g., the capture device's) location within the environment. One suitable approach uses ORB-SLAM with a monocular, stereo, and/or RGB-D camera of the capture device. It will be appreciated that any suitable device and/or camera tracking may be employed.

In some implementations, the device and/or camera tracking information in scan descriptions 236 is utilized by focal level determiner 216 to determine focal distances for visual elements of the 3D representation presented by scanning interface renderer 218. As indicated above, this can include determining a focal plane where the focal distances correspond to the focal plane. A focal distance can be determined or identified using any suitable approach and may represent an optimal scanning distance for one or more sensors performing the scan, such as a camera. In some cases, the focal distance is determined based on a scan mode being utilized for the scan. As one example, a scan mode can be an inside out mode corresponding to a scan of a space surrounding the user, such as a room. Another example of a scan mode is an outside in mode, corresponding to a scan of an object within the space surrounding the user. In some embodiments, focal indicator system 206 identifies and/or determines the scan mode (e.g., from the scan data) and bases the focal distance on the scan mode. It should be appreciated that the focal distance may be updated over time, or may remain fixed throughout a scan. In various implementations, the focal distance corresponds to an real object being scanned.

Focal level determiner 216 further determines focus levels for the visual elements of the 3D representation based on the focal distance(s). For each visual element, a position of the visual element in the 3D representation (e.g., from the depth map) may be compared to the focal distance to determine the focal level for the visual element. It will be appreciated that in some implementations, visual elements could be grouped together and a focus level could be determined for the group.

Reference object identifier 216 is configured to identify one or more reference objects based on the scanned environmental features generated by scan translator 214 (e.g., in real-time during scanning). The reference objects can be selected or identified from reference objects 232. In some cases, reference objects 232 include a collection, catalogue, or library of 3D virtual objects. One or more of these 3D virtual objects may correspond to at least some portion of a real world object and/or environment. For example, a reference object may be generated using a 3D scanner, such as by system 206 or another 3D scanning system. In some cases, a reference object is synthetic and may be created by a user via a 3D modeling or drafting program or otherwise. In some cases, reference objects 232 include a set of primitive reference objects or shapes. A primitive object can refer to a simplest (i.e. 'atomic' irreducible) geometric object that the system can handle (e.g., draw, store). Examples of primitives are a sphere, a cone, a cylinder, a wedge, a torus, a cube, a box, a tube, and a pyramid. Other examples include stock objects, such as tables, chairs, faces, and the like.

Reference object identifier 216 may also determine or identify one or more of object attributes 234 based on the scanned environmental features generated by scan translator 214. Object attributes 234 can include a library, collection, or catalogue of textures, colors, sounds, movements, animations, decals, 3D riggings (animation rigging), and the like. In some cases, system 206 extracts one or more of the object attributes 234 from one or more of reference objects 232 or other 3D virtual objects and incorporates them into the collection. In addition or instead, the object attributes can be stored in association with and/or mapped to corresponding ones of reference objects 232. For example, different textures or other attributes of object attributes 234 may be mapped to different portions of a 3D virtual object in reference objects 232.

Figure 4:
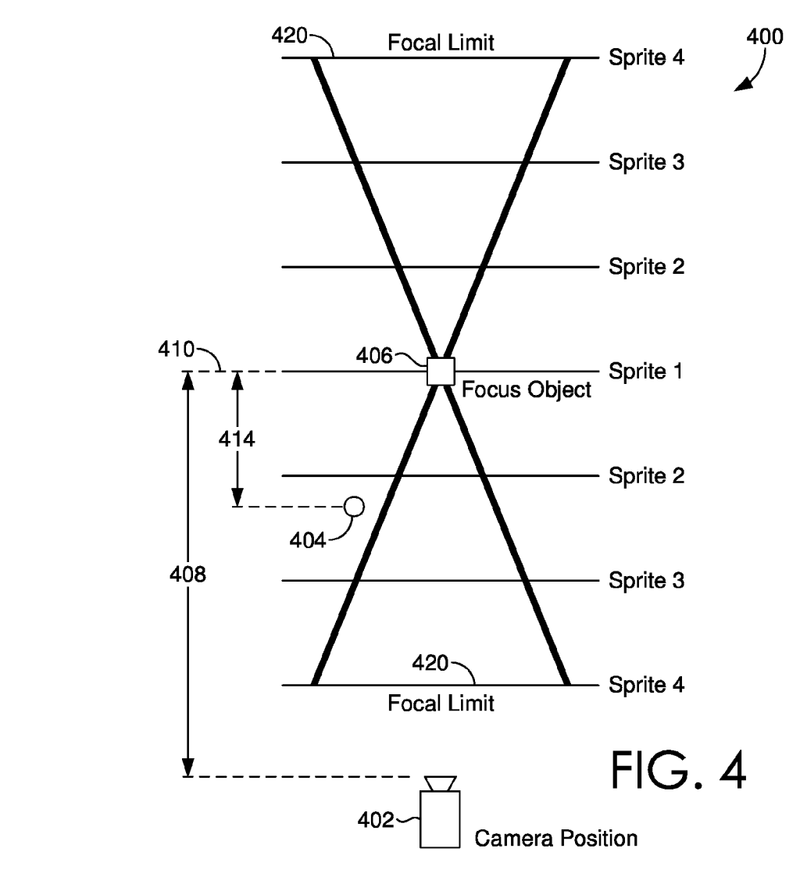
FIG. 4 shows an example of a focal plane diagram, in accordance with embodiments of the present disclosure.

An example of focal level determiner 216 determining a focal level of one or more visual elements is described with respect to FIG. 4. FIG. 4 shows focal plane diagram 400 in accordance with some implementations of the present disclosure. Focal plane diagram 400 shows camera 402, which can correspond to a camera being used to scan the environment, such as a camera integrated into user device 102a. Also shown is focal distance 408 determined or identified by focal level determiner 216, as described above. Focus object 406 (e.g., a real world object or a virtual object) is also shown, and focal level determiner 216 may determine focal plane 410 based on focus object 406. FIG. 4 corresponds to a top view of an environment, and focal plane 410 may intersect focus object 406, as indicated in FIG. 4. In some implementations, 406 is a virtual object (which may correspond to a real object), may be attached to the camera, and distance may be calculated from the virtual object.

FIG. 4 also indicates a relative position of particle 404, which can correspond to one or particles 304A, 304b and 304C, with respect to focal plane 410. Focal level determiner 216 may determine particle 404 is distance 414 from focal plane 410. Further, focal level determiner 216 can determine a focus level for particle 404 by comparing distance 414 to focal distance 408. This can include, for example, subtracting distance 414 from focal distance 408 to determine the focus level. In some cases, the focus level is determined by normalizing the result of the comparison. For example, the result could be mapped to a floating point focus level value between 0 and 1 or another suitable range of values. One end of the range (e.g., 0) may correspond to a particle at focal plane 410, where the particle is considered completely in focus, and the other end of the range (e.g., 1) may correspond to a focal limit, where the particle is considered completely out of focus. As shown, the focal limit can correspond to focal limit 420 in FIG. 4. It is noted that in the present implementation, the absolute value of a particle's distance from the focal plane is employed, such that a particle on the opposing side of focal plane 410 having a distance equal to distance 414 may have a similar focus level as particle 404. The focus level of particles may scale linearly with distance from the focal plane, or according to any other suitable function which may or may not be a continuous function.

Thus, focal level determiner 216 can determine focal levels for at least some of the visual elements of a 3D representation of the scanned environment. These focus levels can correspond to focus levels 234. Focal effect applicator 220 can utilize these focus levels in order to render a depth of field effect for the 3D representation in scanning interface renderer 218. As indicated above, in some cases, this could be performed as a post-effect based on one or more of the focus levels. In other cases, this may be performed using texture, which can be UV mapped to visual elements of the 3D representation.

Figure 5:
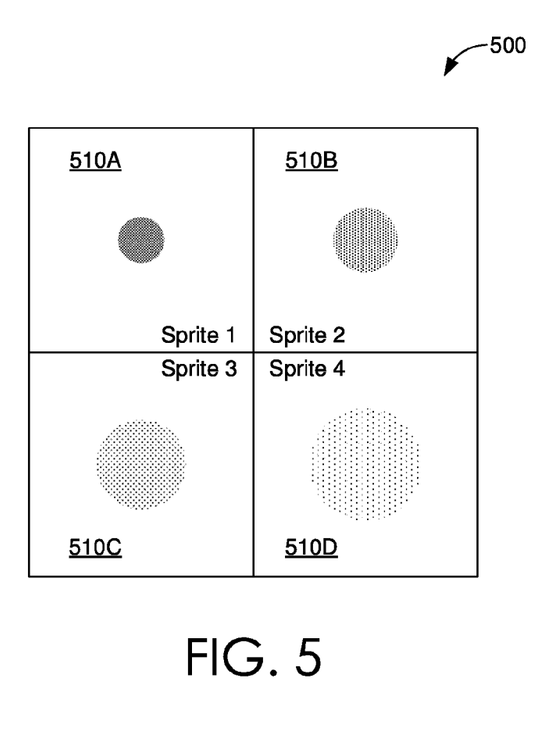
FIG. 5 show an example of textures, in accordance with embodiments of the present disclosure.

FIG. 5 shows an example of a texture sheet, which may be used to render a depth of field effect on a 3D representation of an environment, in accordance with implementations of the present disclosure. In particular, FIG. 5 shows texture sheet 500, which may be the source of the textures employed by focal effect applicator 220 and may correspond to blur textures 232 in FIG. 2. Texture sheet 500 includes texture 510A, texture 510B, texture 510C, and texture 510D, which are each sprites. Each texture corresponds to a respective blur, or focus level. The textures configured such that when applied to a visual element, a corresponding amount of blur will be introduced into the 3D representation. That amount of blur corresponds to the focus level. In this way, as the focus level increases, so will the amount of blur applied to the visual element (e.g., up to the focal limit). In the present example, the size of the blur effect also increases with the focus level. The textures may be increasingly blurred and translucent to increase size and transparency of particles in an appropriate ramp.

In some implementations, focal effect applicator 220 selects one or more of blur textures 232 for a visual element based on the focus level corresponding to the visual element. For example, focal effect applicator 220 may map the focal value to a texture value in a range of values that is based on a quantity of blur textures 232 used for applying the depth of field effect. In the present example, this include four textures, and the range is from a first texture value (e.g., 0) corresponding to texture 510A to a last texture value (e.g., 3) corresponding to texture 510D. An intermediate texture value (e.g., 1) may correspond to texture 510B and another intermediate texture value (e.g., 2) may correspond to texture 510C. This texture value may be a floating point value, and focal effect applicator 220 can set the rendered particle to the texture value. For example, every particle may have a material that holds the values for the particle including its texture sheet and shader, which tell system how to render the particle based on the settings for that material. This way the material can be changed for multiple particle systems all using the same shader to achieve a different result. The shader may refer to instructions for the calculations and the material can hold the variables used (including texture as a variable).

Focal effect applicator 220 can comprise a shader (e.g., an alpha blended emissive shader), which lerps through the sprites (e.g., taken from the texture sheet) based on the floating point value (e.g., 0 is sprite 1, 1 is sprite 2, 2 is sprite 3 and 3 is sprite 4). Each sub-range is clamped so that it will only blend two sprites at a time rather than being a blend of all four sprite. Thus, each particle may be rendered based on its focus level resulting in a depth of field effect, which indicates to the user where to move the camera in order to achieve optimal scan distance.

In some cases, the shader includes an additional sprite for each visual element, which adds bloom to the visual element. The bloom can also similarly be based on the focus level of the particle and may include a control to adjust the amount of bloom to add to the visual element separate from the visual element itself. Thus there may be an equal number of blur textures and bloom textures. In some cases, the user may via scanning interface renderer 218, set the intensity of the bloom for the 3D representation (e.g., the entire set of particles) using a GUI control element, such as a slider or form field. Each blur texture may be in a first channel (e.g., red channel) of the texture sheet and each bloom sprite may be in a second channel (e.g., green channel) of the texture sheet.

It should be appreciated the depth of field effect described herein may be applicable beyond scanning and may generally be applied to visual elements of one or more 3D models. For example, instead of a real camera, a user could be controlling a virtual camera and the focal distance could be set using any suitable criteria. Further, the focal distance need not be referenced to a camera and could be referenced to a character in a video game or 3D scene, or some other reference position in 3D space. In some cases, a side scroller could include foreground elements and background elements to which multiple images are rendered for and depth of field effect may be applied by blending between different blur textures. Further, in addition to or instead of applying blur, in some variations, the textures increasingly intensify with respect to some other criteria, such as color shade, contrast, hue, and/or other visual texture parameter.

Figure 6:
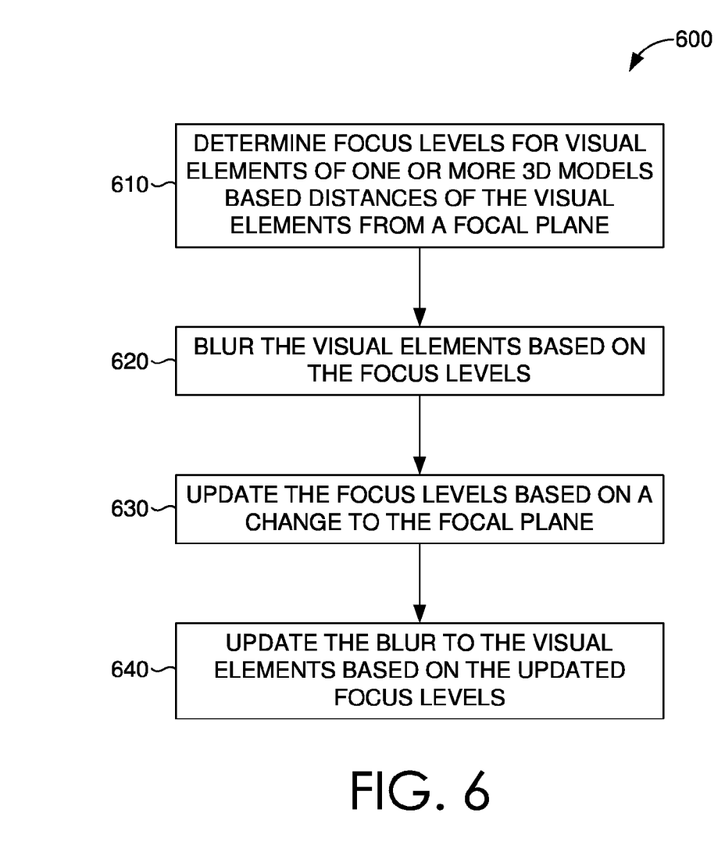
FIG. 6 is a flow diagram showing a method in accordance with embodiments of the present disclosure.

FIGS. 6, 7, 8, 9, 10, and 11 depict examples of flow diagrams in accordance with aspects of the present disclosure. Referring now to FIG. 6, FIG. 6 is a flow diagram showing method 600 for simulating depth of field in accordance with disclosed embodiments. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 630, method 600 includes determining focus levels for visual elements of one or more 3D models based on distance of the visual elements from a focal plane. At block 640, method 600 includes blurring the visual elements based on the determined focus levels. At block 650, method 600 includes updating the focus levels based on determining a change to the focal plane. At block 660, method 600 includes updating the blur to the visual elements based on the updated focus levels.

Figure 7:
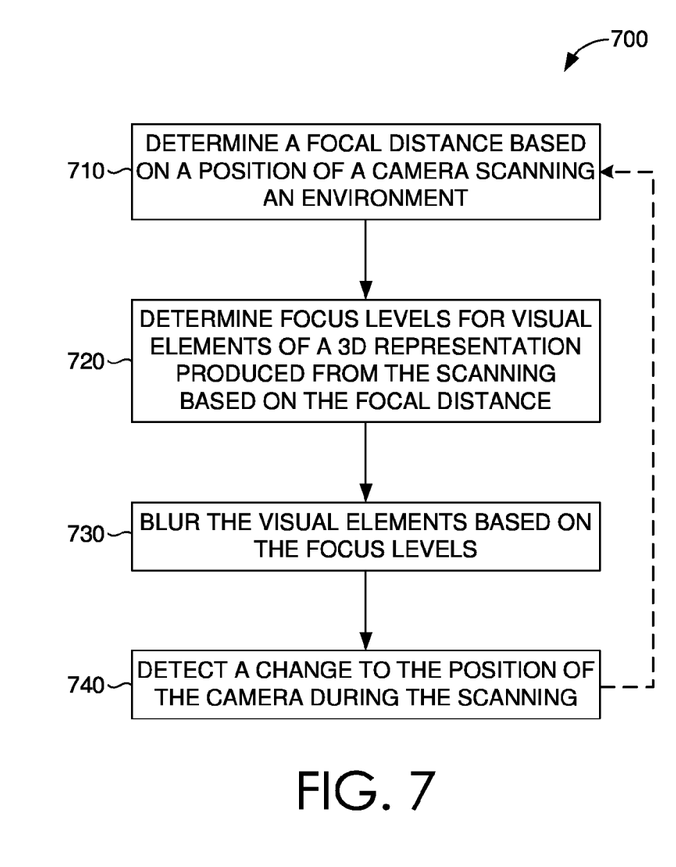
FIG. 7 is a flow diagram showing a method in accordance with embodiments of the present disclosure.

Referring now to FIG. 7, FIG. 7 is a flow diagram showing method 700 for simulating depth of field in accordance with disclosed embodiments. At block 730, method 700 includes determining a focal distance based on a position of a camera scanning an environment. At block 740, method 700 includes determining focus levels for visual elements of a 3D representation produced from the scanning based on the determined focal distance. At block 750, method 700 includes blurring the visual elements based on the determined focus levels. At block 760, method 700 includes detecting a change to the position of the camera during the scanning. As indicated in FIG. 7, method 700 can be repeated based on detecting the change to the position of the camera.

Figure 8:
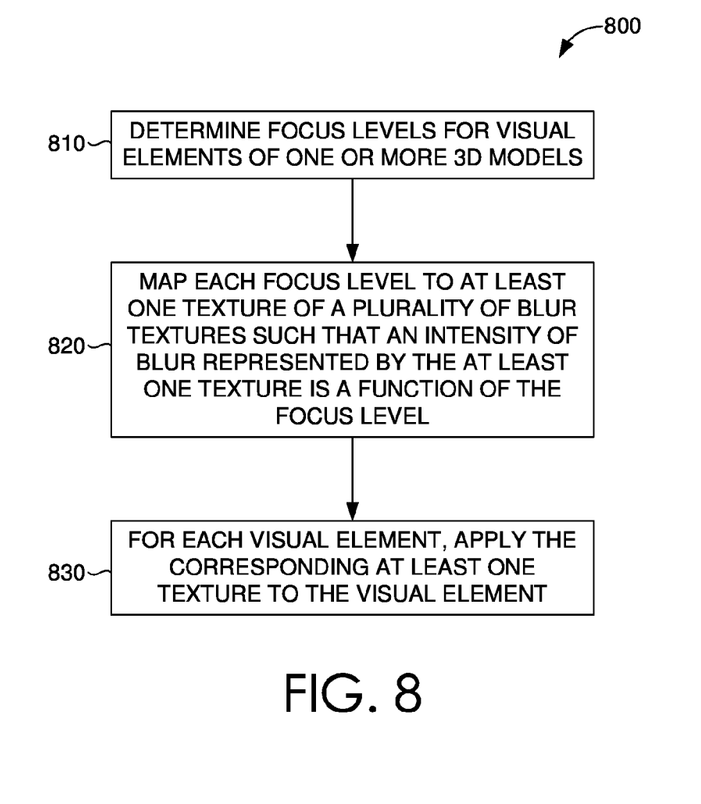
FIG. 8 is a flow diagram showing a method in accordance with embodiments of the present disclosure.

Referring now to FIG. 8, FIG. 8 is a flow diagram showing method 800 for simulating depth of field in accordance with disclosed embodiments. At block 830, method 800 includes determining focus levels for visual elements of one or more 3D models. At block 840, method 800 includes mapping each focus level to at least one texture of a plurality of blur textures such that an intensity of blur represented by the at least one texture is a function of the focus level. At block 850, method 800 includes for each visual element, applying the corresponding at least one texture to the visual element.

Figure 9:
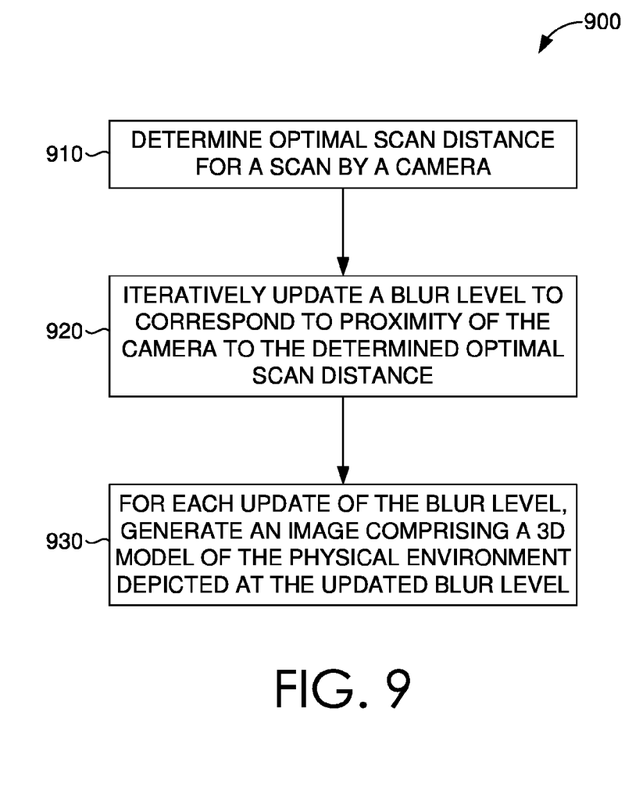
FIG. 9 is a flow diagram showing a method in accordance with embodiments of the present disclosure.

Referring now to FIG. 9, FIG. 9 is a flow diagram showing method 900 for simulating depth of field in accordance with disclosed embodiments. At block 930, method 900 includes determining an optimal scan distance for a scan by a camera. At block 940, method 900 includes iteratively updating a blur level to correspond to a proximity of the camera to the determined optimal scan distance. At block 950, method 900 includes for each update of the blur level generating an image comprising a 3D model of the physical environment depicted at the updated blur level.

Figure 10:
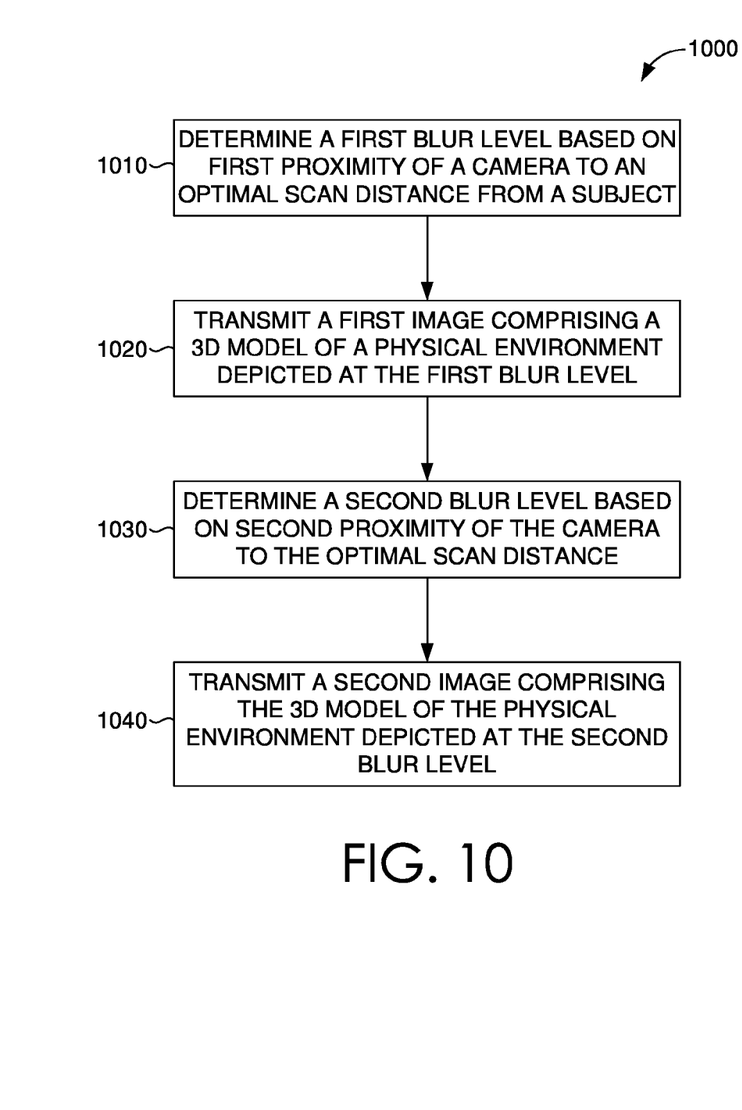
FIG. 10 is a flow diagram showing a method in accordance with embodiments of the present disclosure.

Referring now to FIG. 10, FIG. 10 is a flow diagram showing method 1000 for simulating depth of field in accordance with disclosed embodiments. At block 1030, method 1000 includes determining a first blur level based on a first proximity of a camera to an optimal scan distance from a subject. At block 1040, method 1000 includes transmitting a first image comprising a 3D model of a physical environment depicted at the first blur level. At block 1050, method 1000 includes determining a second blur level based on a second proximity of the camera to the optimal scan distance. At block 1060, method 1000 includes transmitting a second image comprising the 3D model of the physical environment depicted at the second blur level.

Figure 11:
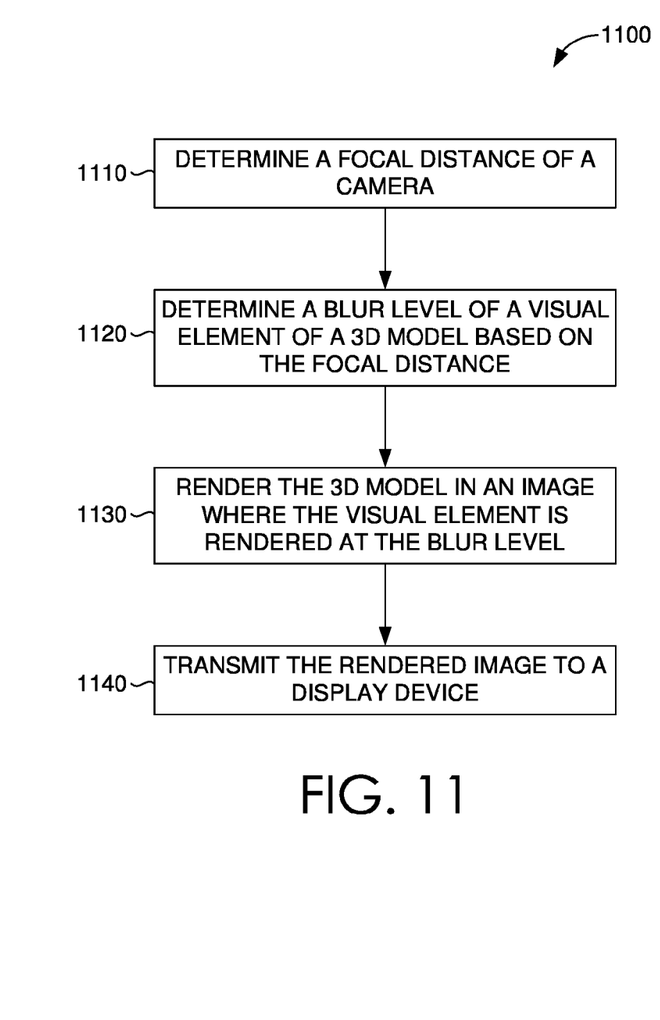
FIG. 11 is a flow diagram showing a method in accordance with embodiments of the present disclosure.

Referring now to FIG. 11, FIG. 11 is a flow diagram showing method 1100 for simulating depth of field in accordance with disclosed embodiments. At block 1130, method 1100 includes determining a focal distance of a camera. At block 1140, method 1100 includes determining a blur level of a visual element of a 3D model based on the focal distance. At block 1150, method 1000 includes rendering the 3D model in an image where the visual element is rendered at the blur level. At block 1160, method 1100 includes transmitting the rendered image to a display device.

Figure 12:
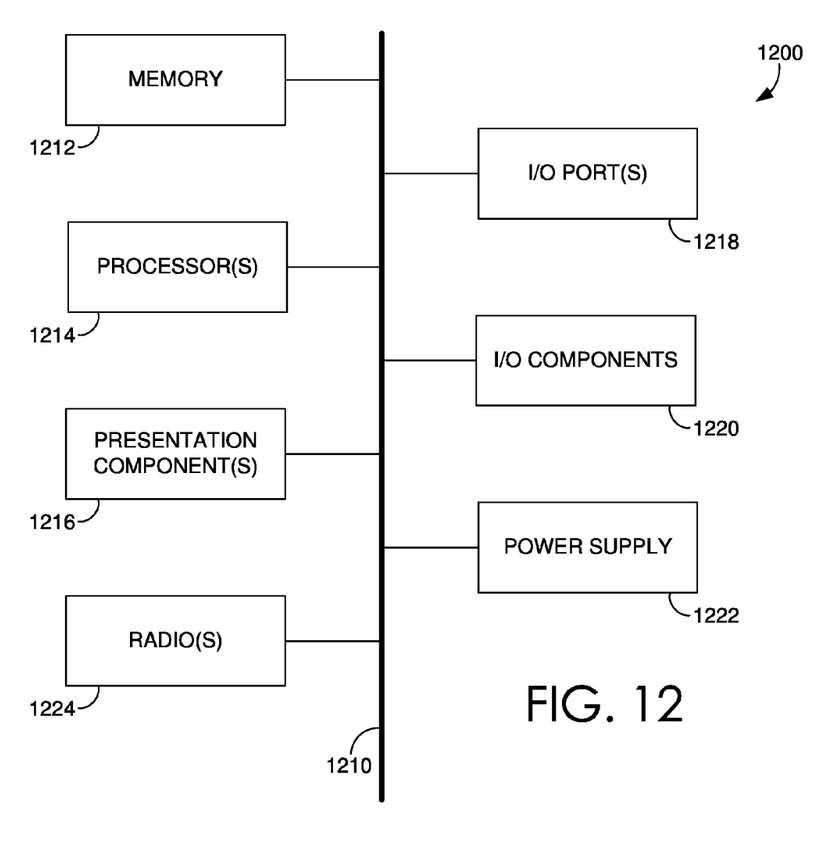
FIG. 12 is a block diagram of an exemplary computing environment suitable for use in implementing embodiments of the present disclosure.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 12 is merely illustrative of an exemplary computing device that can be used in connection with one or more embodiments of the present invention. Distinction is not made between such categories as "workstation," "server," "laptop," "handheld device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1200. Computing device 1200 may be equipped with depth cameras, such as stereoscopic camera systems, infrared camera systems, RGB camera systems, and combinations of these, for gesture detection and recognition. Additionally, computing device 1200 may be equipped with accelerometers or gyroscopes that enable detection of motion. The output of the accelerometers or gyroscopes may be provided to the display of computing device 1200 to render immersive augmented reality or virtual reality.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method comprising:
   determining an optimal scan distance of a camera from a subject in a physical environment for a scan of the subject by the camera;
   iteratively updating a blur level to correspond to a proximity of the camera to the determined optimal scan distance as the proximity changes during the scan; and
   for each update to the blur level from the iteratively updating, generating, on a user device associated with the scan, an image comprising a three-dimensional (3D) model of the physical environment depicted at the updated blur level, the 3D model produced from the scan, the generating comprising:
   blending a first texture with a second texture based on determining that a value of the blur level is greater than a first value corresponding to the first blur texture and a second value corresponding to the second blur texture, and performing the blurring of the 3D model with the blended first texture and second texture for the image.

2. The computer-implemented method of claim 1, wherein the iteratively updating comprises in each iteration determining the proximity, wherein the updated blur level is proportional to the determined proximity.

3. The computer-implemented method of claim 1, wherein the determining of the optimal scan distance is based on tracking a position of the camera in the physical environment with sensors of the user device.

4. The computer-implemented method of claim 1, wherein in the iteratively updating, the blur level increases based on the proximity decreasing and decreases based on the proximity increasing.

5. The computer-implemented method of claim 1, wherein the generating of the image comprises a particle shader blurring on a particle of the 3D model at the blur level.

6. The computer-implemented method of claim 1, wherein the iteratively updating comprises for each iteration, determining the updated blur level based on a position of the camera in the physical environment.

7. The computer-implemented method of claim 1, determining the blur level such that the blur level is minimized when the camera is at the optimal scan distance.

8. One or more computer-storage media having executable instructions embodied thereon, which, when executed by one or more processors, cause the one or more processors to perform a method comprising:

determining an optimal scan distance of a camera from a subject in a physical environment for a scan of the subject by the camera;

iteratively updating a blur level to correspond to a proximity of the camera to the determined optimal scan distance as the proximity changes during the scan; and for each update to the blur level from the iteratively updating, generating, on a user device associated with the scan, an image comprising a three-dimensional (3D) model of the physical environment depicted at the updated blur level, the 3D model produced from the scan, the generating comprising:

blending a first texture with a second texture based on determining that a value of the blur level is greater than a first value corresponding to the first blur texture and a second value corresponding to the second blur texture, and performing the blurring of the 3D model with the blended first texture and second texture for the image.

9. The one or more computer-storage media of claim 8, wherein the iteratively updating comprises in each iteration determining the proximity, wherein the updated blur level is proportional to the determined proximity.

10. The one or more computer-storage media of claim 8, wherein the determining of the optimal scan distance is based on tracking a position of the camera in the physical environment with sensors of the user device.

11. The one or more computer-storage media of claim 8, wherein in the iteratively updating, the blur level increases based on the proximity decreasing and decreases based on the proximity increasing.

12. The one or more computer-storage media of claim 8, wherein the generating of the image comprises a particle shader blurring on a particle of the 3D model at the blur level.

13. The one or more computer-storage media of claim 8, wherein the iteratively updating comprises for each iteration, determining the updated blur level based on a position of the camera in the physical environment.

14. The one or more computer-storage media of claim 8, the method further comprising determining the blur level such that the blur level is minimized when the camera is at the optimal scan distance.

15. A system, comprising:
one or more processors;
one or more computer-storage media having executable instructions embodied thereon, which, when executed by one or more processors, cause the one or more processors to perform a method comprising:

determining an optimal scan distance of a camera from a subject in a physical environment for a scan of the subject by the camera;

iteratively updating a blur level to correspond to a proximity of the camera to the determined optimal scan distance as the proximity changes during the scan; and for each update to the blur level from the iteratively updating, generating, on a user device associated with the scan, an image comprising a three-dimensional (3D) model of the physical environment depicted at the updated blur level, the 3D model produced from the scan, the generating comprising:

blending a first texture with a second texture based on determining that a value of the blur level is greater than a first value corresponding to the first blur texture and a second value corresponding to the second blur texture, and performing the blurring of the 3D model with the blended first texture and second texture for the image.

16. The system of claim 15, wherein the iteratively updating comprises in each iteration determining the proximity, wherein the updated blur level is proportional to the determined proximity.

17. The system of claim 15, wherein the determining of the optimal scan distance is based on tracking a position of the camera in the physical environment with sensors of the user device.

18. The system of claim 15, wherein in the iteratively updating, the blur level increases based on the proximity decreasing and decreases based on the proximity increasing.

19. The system of claim 15, wherein the generating of the image comprises a particle shader blurring on a particle of the 3D model at the blur level.

20. The system of claim 15, wherein the iteratively updating comprises for each iteration, determining the updated blur level based on a position of the camera in the physical environment.

* * * * *